(12) United States Patent
Sela et al.

(10) Patent No.: US 10,749,905 B2
(45) Date of Patent: Aug. 18, 2020

(54) SYSTEM, METHOD, AND COMPUTER PROGRAM PROVIDING SECURITY IN NETWORK FUNCTION VIRTUALIZATION (NFV) BASED COMMUNICATION NETWORKS AND SOFTWARE DEFINED NETWORKS (SDNS)

(71) Applicant: Amdocs Development Limited, Limassol (CY)

(72) Inventors: Daniel Sela, Petah Tikva (IL); Ofer Hermoni, Plano, TX (US); Yosef Asaf Hermush, Tel Aviv (IL); Eyal Felstaine, Kfar Shmaryahu (IL)

(73) Assignee: AMDOCS DEVELOPMENT LIMITED, Limassol (CY)

(*) Notice: Subject to any disclaimer, the term of this patent is extended or adjusted under 35 U.S.C. 154(b) by 161 days.

(21) Appl. No.: 16/044,442

(22) Filed: Jul. 24, 2018

(65) Prior Publication Data
US 2019/0036968 A1    Jan. 31, 2019

Related U.S. Application Data

(60) Provisional application No. 62/539,362, filed on Jul. 31, 2017.

(51) Int. Cl.
*H04L 29/06* (2006.01)
*H04L 12/24* (2006.01)

(52) U.S. Cl.
CPC .......... *H04L 63/20* (2013.01); *H04L 41/0813* (2013.01); *H04L 63/1416* (2013.01)

(58) Field of Classification Search
CPC . H04L 41/0813; H04L 63/1416; H04L 63/20; H04L 63/00; H04L 41/0816
See application file for complete search history.

(56) References Cited

U.S. PATENT DOCUMENTS 6,530,022 B1 * 3/2003 Blair ................... H04L 63/0823
                                                      713/175
9,306,965 B1 * 4/2016 Grossman ........... H04L 63/1425
(Continued)

OTHER PUBLICATIONS

Jafar Haadi Jafarian et al., OpenFlow Random Host Mutation: Transparent Moving Target Defense using Software Defined Networking, Aug. 2012. Proceedings of the first workshop on Hot topics in software defined networks. Association for Computing Machinery, New York, NY, USA. (Year: 2012).*

(Continued)

*Primary Examiner* — John B King
(74) *Attorney, Agent, or Firm* — Zilka-Kotab, P.C.

(57) ABSTRACT

A system, method, and computer program product are provided for providing security in Network Function Virtualization (NFV) based communication networks and Software Defined Networks (SDNs). In use, a system implements one or more network changes or security configuration changes to an NFV based communication network or a SDN to change an attack surface. In one embodiment, implementing the one or more network changes or security configuration changes to the NFV based communication network or the SDN may occur periodically to change the attack surface. In another embodiment, implementing the one or more network changes or the security configuration changes to the NFV based communication network or the SDN to change the attack surface may occur based on detection of a malicious event or a suspicious event.

8 Claims, 12 Drawing Sheets

(56) References Cited

U.S. PATENT DOCUMENTS

| | | | |
|---|---|---|---|
| 9,460,286 B1 | 10/2016 | Felstaine et al. | |
| 10,355,853 B1* | 7/2019 | Surmi | G06F 21/575 |
| 2007/0192863 A1* | 8/2007 | Kapoor | H04L 67/10 |
| | | | 726/23 |
| 2010/0082792 A1* | 4/2010 | Johnson | G01D 4/004 |
| | | | 709/223 |
| 2011/0214157 A1* | 9/2011 | Korsunsky | H04L 63/1441 |
| | | | 726/1 |
| 2014/0304765 A1* | 10/2014 | Nakamoto | H04L 63/20 |
| | | | 726/1 |
| 2015/0350003 A1* | 12/2015 | Anderson | H04L 29/06965 |
| | | | 726/3 |
| 2017/0142163 A1 | 5/2017 | Sood et al. | |
| 2017/0353490 A1* | 12/2017 | Krauss | H04L 63/1491 |
| 2018/0375897 A1* | 12/2018 | Kawasaki | H04L 63/1491 |

OTHER PUBLICATIONS

Open Networking Foundation, ONF Whitepaper, Software-Defined Networking:The New Norm for Networks, Apr. 13, 2012, Open Networking Foundation, Palo Alto, CA (Year: 2012).*

Open Network Foundation, OpenFlow Switch Specification, Version 1.5.1 ( Protocol version 0x06 ), Mar. 26, 2015, Open Networking Foundation, Palo Alto, CA (Year: 2015).*

International Search Report and Written Opinion from PCT Application No. PCT/IB2018/055690, dated Nov. 6, 2018.

* cited by examiner

SYSTEM, METHOD, AND COMPUTER PROGRAM PROVIDING SECURITY IN NETWORK FUNCTION VIRTUALIZATION (NFV) BASED COMMUNICATION NETWORKS AND SOFTWARE DEFINED NETWORKS (SDNS)

CLAIM OF PRIORITY AND RELATED APPLICATIONS

This application claims the benefit of U.S. Provisional Application No. 62/539,362, filed Jul. 31, 2017, the entire contents of which are incorporated herein by reference.

FIELD OF THE INVENTION

The present invention relates to telecommunications and/or data communications and, more particularly to network function virtualization (NFV) of telecommunications networks.

BACKGROUND

Network Function Virtualization is a term or a name of a proposed architecture of telecom services as published by the European Telecommunications Standards Institute (ETSI) in a series of documents available from the ETSI website. NFV uses generic hardware platform and software adapted for the generic hardware platform. Thus, NFV creates a network much more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently.

The flexibility of the NFV-based network enhances the means available for optimizing the network's capacity and performance. However, current techniques for providing security in NFV networks are limited.

There is thus a need for addressing these and/or other issues associated with the prior art.

SUMMARY

A system, method, and computer program product are provided for providing security in Network Function Virtualization (NFV) based communication networks and Software Defined Networks (SDNs). In use, a system implements one or more network changes or security configuration changes to an NFV based communication network or a SDN to change an attack surface. In one embodiment, implementing the one or more network changes or security configuration changes to the NFV based communication network or the SDN may occur periodically to change the attack surface. In another embodiment, implementing the one or more network changes or the security configuration changes to the NFV based communication network or the SDN to change the attack surface may occur based on detection of a malicious event or a suspicious event.

DETAILED DESCRIPTION

Figure 1:
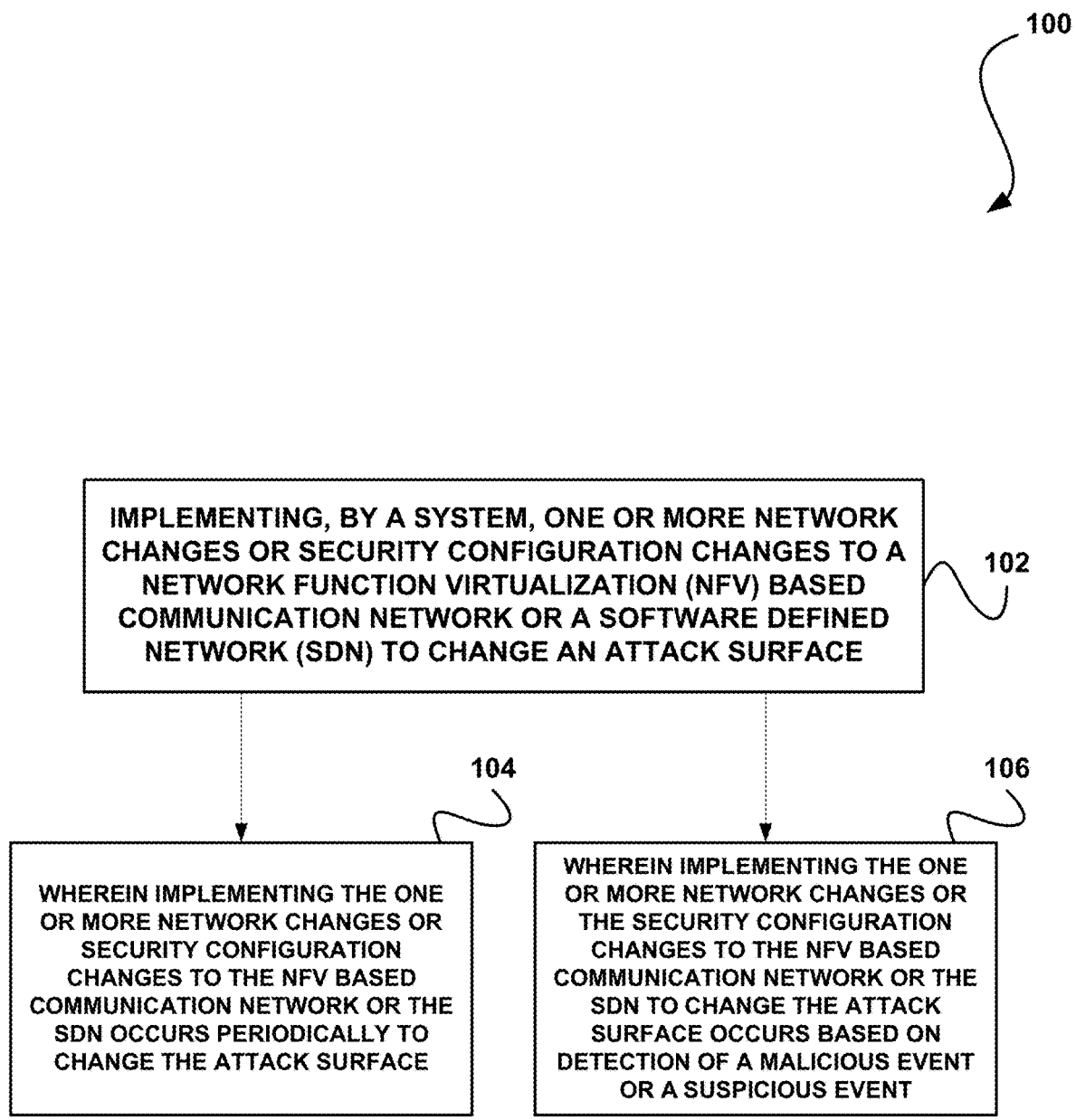
FIG. 1 illustrates a method for providing security in Network Function Virtualization (NFV) based communication networks and Software Defined Networks (SDNs), in accordance with one embodiment.

FIG. 1 illustrates a method 100 for providing security in Network Function Virtualization (NFV) based communication networks and Software Defined Networks (SDNs), in accordance with one embodiment.

In operation, a system implements one or more network changes or security configuration changes to an NFV based communication network or a SDN to change an attack surface. See operation 102. The attack surface of a software environment refers to the sum of the different points where an unauthorized user can try to attack an environment.

In one embodiment, implementing the one or more network changes or security configuration changes to the NFV based communication network or the SDN may occur periodically to change the attack surface. See operation 104. For example, the attack surface may be changed based on a time (e.g. day, week, month, etc.) or based on other criteria/events, etc.

In another embodiment, implementing the one or more network changes or the security configuration changes to the NFV based communication network or the SDN to change the attack surface may occur based on detection of a malicious event or a suspicious event. See operation 106. For example, the system (or another/external system) may monitor the NFV based communication network or the SDN. The system (or another/external system) may identify a security attack on at least one asset of the NFV based communication network or the SDN. This may include receiving notifications from or invoked by another system, such as a security information and event management (SIEM) or incident response system, or by identifying the attack directly. The system may implement one or more network or the security configuration changes to the NFV based communication network or the SDN (or the cloud) to change the attack surface to block the security attack.

The asset (also referred to as an NFV network asset) may include, but is not limited to, computing machines, hardware, software, data and/or content, and connectivity. The term "computing machine" relates to any type or combination of computing devices, or computing-related units, including, but not limited to, a processing device, a memory device, a storage device, and/or a communication device.

In one embodiment, the system may replace the asset with at least one other equivalent asset with different properties from the at least one asset to eliminate the security attack, while maintaining the service continuity. The system may replace software, infrastructure, and topology in order to neutralize attacks.

Further, in one embodiment, implementing the one or more network changes or security configuration changes may include instantiating at least one new network element in the NFV based communication network or the SDN. In another embodiment, implementing the one or more network changes or security configuration changes may include changing a configuration of at least one network element in the NFV based communication network or the SDN. In yet another embodiment, the system may make changes to a configuration of the network generally, as opposed to specific network elements. Additionally, in one embodiment, implementing the one or more network changes or security configuration changes to the NFV based communication network or the SDN may include implementing a tunneling protocol.

Furthermore, in one embodiment, the system may verify that the one or more network changes or security configuration changes have been applied. As an option, the system may remediate one or more security issues associated with the NFV based communication network or the SDN.

It should be noted that the NFV based communication network or the SDN may be associated with a private cloud or a public cloud.

In the context of the present description, the terms "network" and "communication network" refer to the hardware and software connecting one or more communication elements including wireline networks, wireless networks, and/or combinations thereof.

The terms "network function virtualization" (NFV) and virtual network function (VNF) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breach or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The principles and operation of a system, method, and computer program product for providing security in NFV-based communication networks according to various embodiments may be further understood with reference to the following drawings and accompanying description.

Figure 2:
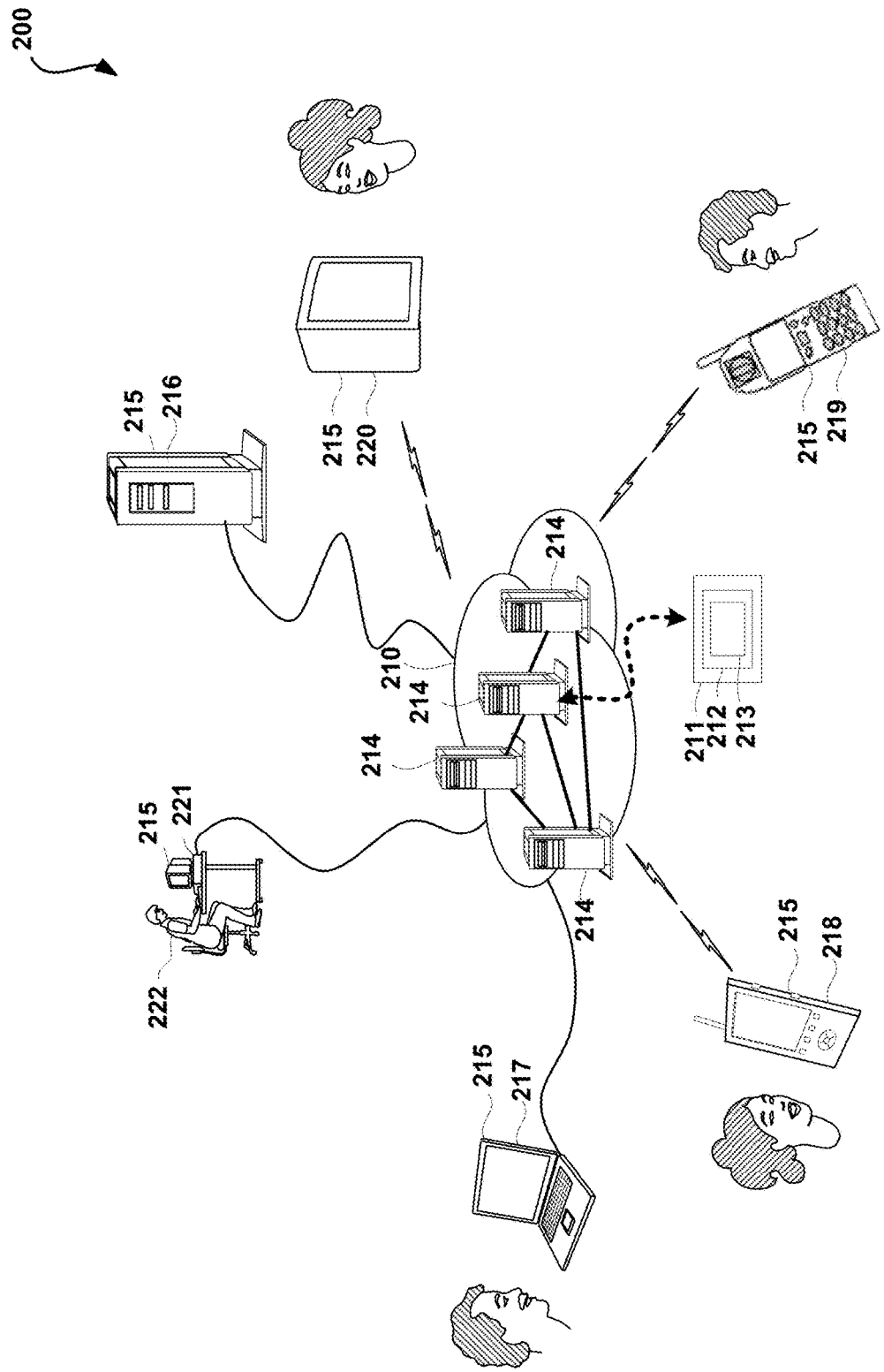
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 211, an NFV-orchestration (NFV-O) module 212, and a security module 213, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212 and the security module 213.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

The security module 213 may be a part or a component of the NFV-O module 212. However, the security module 213, the NFV-O module 212 and the NFV management system 211 may be separate software programs provided by different vendors. In one embodiment, the NFV-based network 210 may even have a plurality of any of the NFV management systems 211, the NFV-O modules 212, and/or the security modules 213.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.), etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, the NFV-O 212, and the security module 213.

Figure 3:
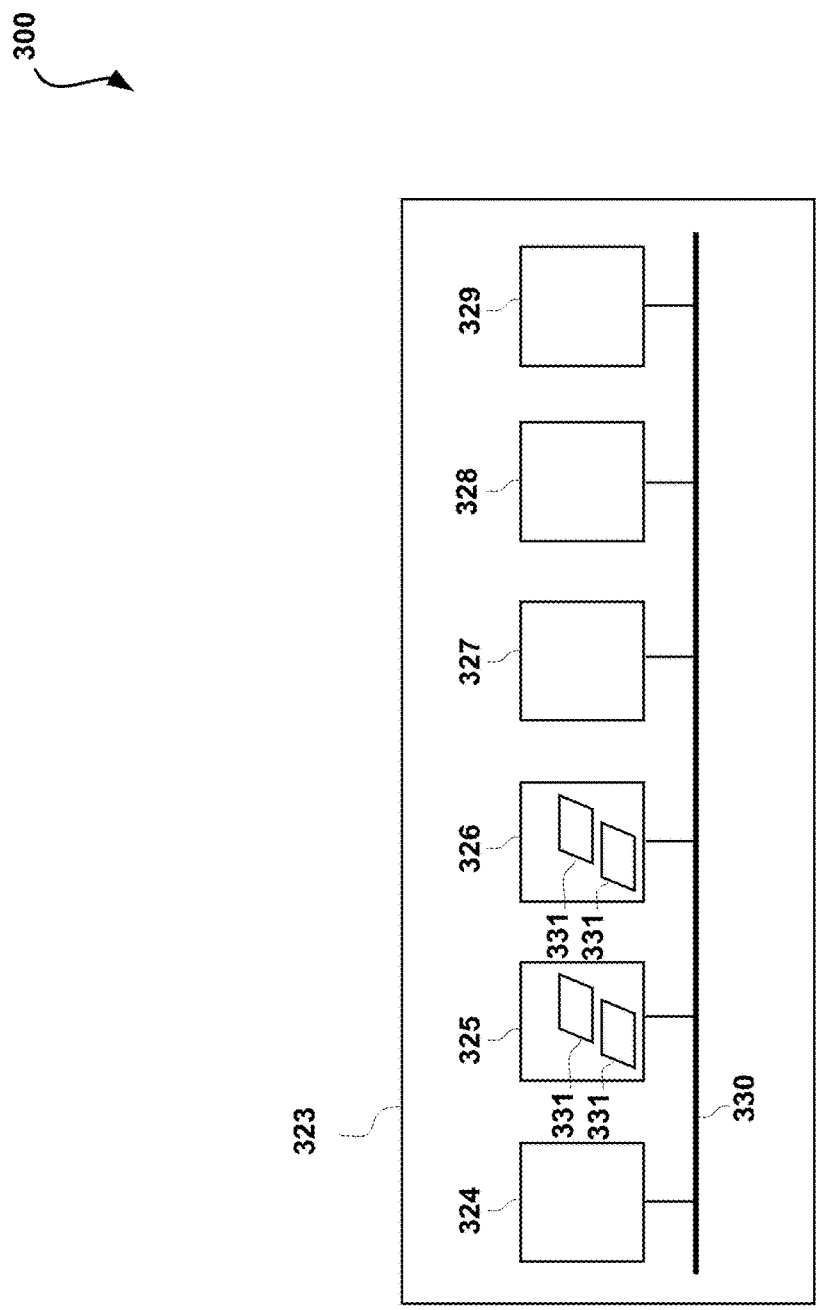
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211, the NFV-O 212, and/or the security module 213 of FIG. 2.

Figure 4:
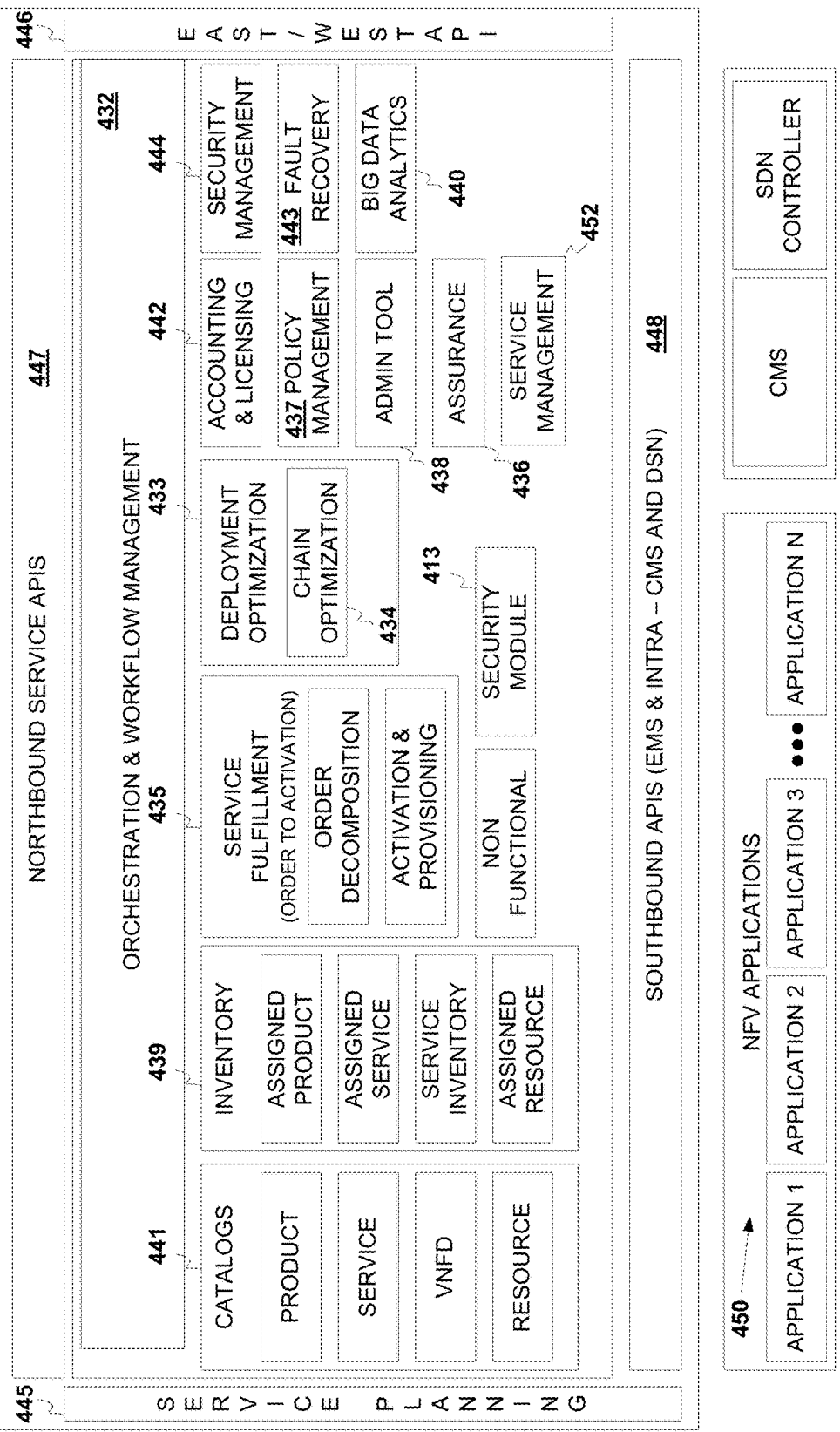
FIG. 4 illustrates a simplified diagram of an NFV management system, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412, and a security module 413. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfillment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations, What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMS s and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The security module 413 may also be part of the NFV-O module 412. The security module 413 is operable to implement the method 100 of FIG. 1, as well as other security techniques described herein.

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfillment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
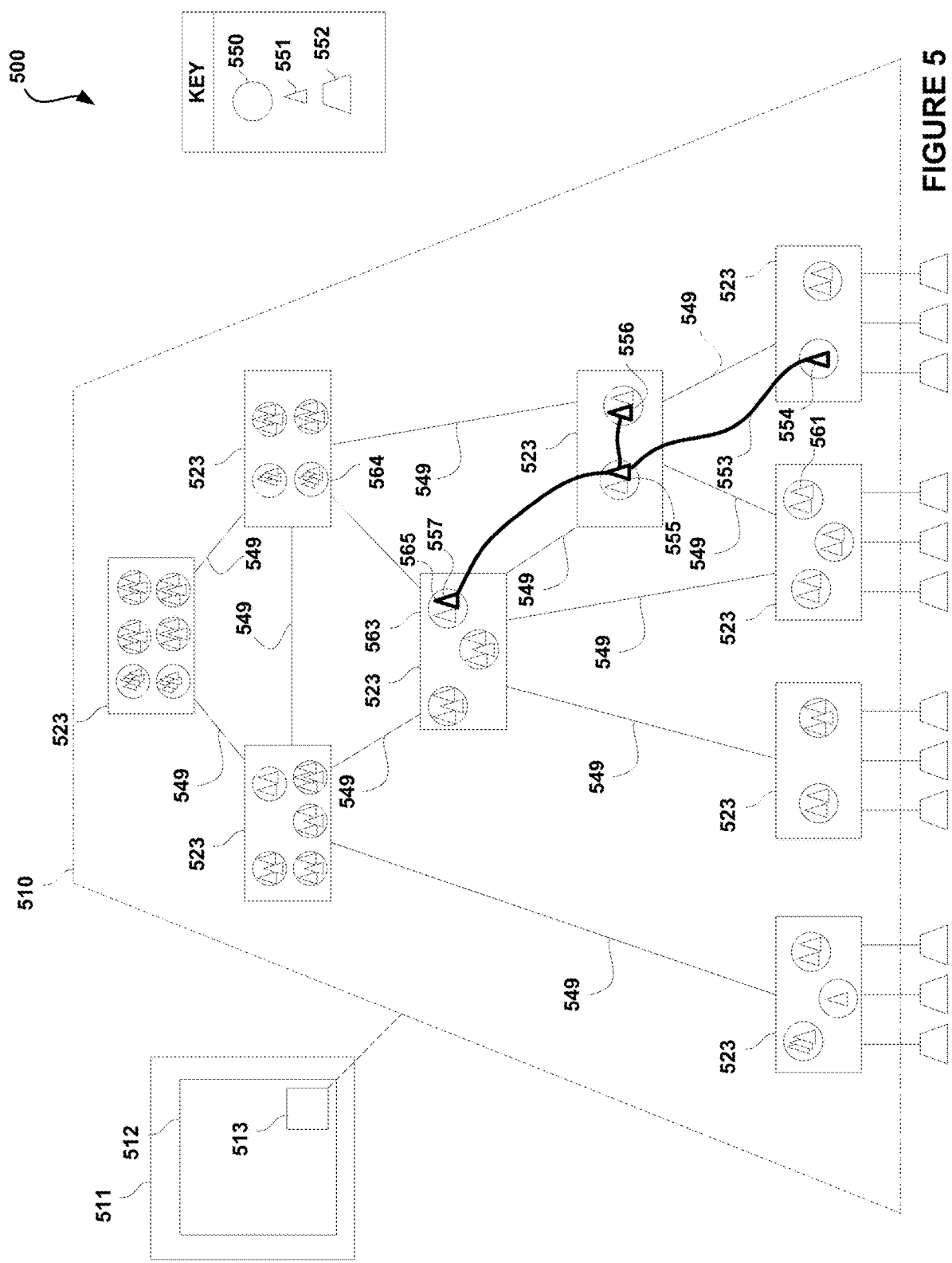
FIG. 5 illustrates a simplified diagram of a deployed NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511, an NFV-orchestration (NFV-O) 512, and a security module 513 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other.

Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for rollback and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

Computer networks are made of connected computing devices that can exchange data. Computing devices in a software defined network and/or NFV-based network may contain hardware and software layers such as, but not limited to, CPUs, memory, storage devices, Virtualized Infrastructure Managers, infrastructure (i.e. kernels), operating systems, containers, applications, services, and more. Each of these elements may have one or more alternatives. The security implementation described herein uses this fact to change components that are in the network, while maintaining functionality.

Changing elements in a network increases the complexity of preparing an attack against the network as an implementer cannot predict what the elements in the network will be at the time of the attack, when the next network change will be, and how a network change will affect the attack.

To accomplish this, a component of the NFV or SDN network (e.g. a security VNF, security orchestrator, third party security system, etc.) continuously monitors and manages network assets (e.g. NFV or SDN assets, etc.). By monitoring network/communication data, asset state and status, and resource consumption, etc., an attack on network assets can be identified.

Attacks usually take advantage of a specific security hole or vulnerability present in an application or the infrastructure. The targeted vulnerability is a collection of the attacker's pre-assumptions about a victim and set of conditions that must be met for the attack to succeed. Of course, an attacker may use any security hole or multiple holes or multiple vulnerabilities to jeopardize system security, etc.

The security component relies on this and changes software components as well as infrastructure properties and topology, either in a random manner (e.g. which may be chosen periodically, etc.) or according to a decision made by a network/security administrator or software component. These changes are aimed to either eliminate detected attacks or create an ever-changing network that attackers cannot predict and therefore cannot prepare for in advance.

In operation, a security attack is identified, by the NFV system and/or another security system. The security attack may include any type of security attack. The attacked asset may be a physical machine, virtual machine, service, and/or application, etc., and may be in the customer premise, on the NFV network or on the public or private cloud.

The attacked asset is identified along with its metadata/properties (e.g. IP segment, operating system type and version, communication/service protocol(s), installed applications, network and security configurations, etc.). Attacked asset metadata and properties can be gathered from, for example: network activity; an active directory (e.g. machine roles, users, types, patching, etc.); installed security systems—either host based or network based (e.g. security alerts, host/network activity history, users, machine type, patching, etc.); the machine itself by techniques such as Windows Management Instrumentation (WMI), remote code execution, installed agents, etc. (e.g. information includes installed applications, running services, configurations, communication interfaces, etc.); an orchestrator that created the machine, which may have sensors/monitoring points that continuously collect data and has been given its properties and configurations, installed services and more as part of the Virtual Network Function software package; active inventory; and/or cloud management system inventory; etc.

Further, the source of the attack may be identified along with its metadata/properties. Gathered information about the attack source and attacked assets enables the system to map the replacement of installed applications, services, ports, protocols, infrastructure elements, communication protocol, and/or communication link, etc. It should be noted that, in some cases, the source of the attack may be outside of the system.

The system makes network and security changes, which may include, but is not limited to network changes (e.g. segmentation, communication/service protocols and communication ports, etc.) being applied to alter access from the attack source to network assets, and to the attacked asset in particular. In addition, changes are made to minimize the attack surface according to the newly discovered threat. Changes may also include, in addition to previous examples, the migration of services and/or machines and/or applications between the cloud, the NFV network, the customer premises, premises of a communication service provider, etc.

The changes may also include security changes (e.g. firewall rules, operating system patching, application management, remediation/format/reinstallation, etc.) being applied to alter access from the attack source to network assets, and to the attacked asset in particular. In addition, changes may be made to minimize the attack surface according to the newly discovered threat.

The changes may also include changes in container architectures, micro-service architectures, service chaining, and/or loaded libraries, etc.

Optionally, the NFV-based communication network may include and implement a validation component (e.g. a VNF), which assures that the changes have been applied. This can help detect misbehavior in the case of compromised NFV infrastructure or NFV orchestrator components (see, for example, FIG. 6).

Changes in properties of the attacked asset may be made in a way that renders the attack ineffective and maintains the asset's availability (e.g. redundancy, hot-backup, replication techniques, etc.) and functionality. One example may include, an Apache webserver on port 80 being attacked, and being replaced by a Tomcat webserver on port 8080. As another example, a Windows server 2012 may be attacked, and in response, may be replaced by a Linux server running the same service. As another example, a DNS poisoning attack may be detected, and the DNS may be tunneled over ICMP.

In one embodiment, after a "safety" period, changes can be rolled back or re-arranged, if and as needed.

As another example of the security implementation, in one embodiment, the system may be configured for periodical changes. In this case, an event (e.g. either a time-based event, network event, or system/security/network administrator, etc.) may trigger the system to perform changes.

The system then makes network changes (e.g. segmentation, communication/service protocols and communication ports, etc.) and applies the network changes to alter access from the attack source to network assets, and to the attacked asset in particular. In addition, changes may be made to minimize the attack surface according to the newly discovered threat. Further, security changes (e.g. firewall rules, operating system patching, application management, remediation/format/reinstallation, etc.) may be applied to alter access from the attack source to network assets, and to the attacked asset in particular. In addition, changes may be made to minimize the attack surface according to the newly discovered threat.

Optionally, the system may include a validation component, which assures that the changes have been applied. This can help detect misbehavior in the case of compromised NFV infrastructure or NFV orchestrator components (see, for example, FIG. 6).

Functionality and availability may be maintained as each replaced item is replaced with an item with different attributes and properties but similar functionality, such that service continuity is maintained.

Examples may include: applications (e.g. Adobe reader by Foxit reader, IIS by apache or tomcat, Linux RH by Windows or Linux Ubuntu, etc.); protocols—tunneling, proxy/reverse proxy setups, etc. can help transmit data over different protocols without affecting functionality; and infrastructure, such as virtual machines being moved from one server to another (e.g. different hardware, manufacturer, etc.).

This solution/system is also relevant to non-NFV networks and, for example, can be used also to protect software functions running on a public or private cloud infrastructure such as AWS or Azure, which have orchestration capabilities. Furthermore, the solution/system can also be used to protect single computers/endpoint devices (with the appropriate orchestrator), for example, when replacing Adobe reader by Foxit reader (two software programs for reading PDF files by end users; attackers can embed malware in PDF files and different readers would have different sensitivities for such malware).

Figure 6:
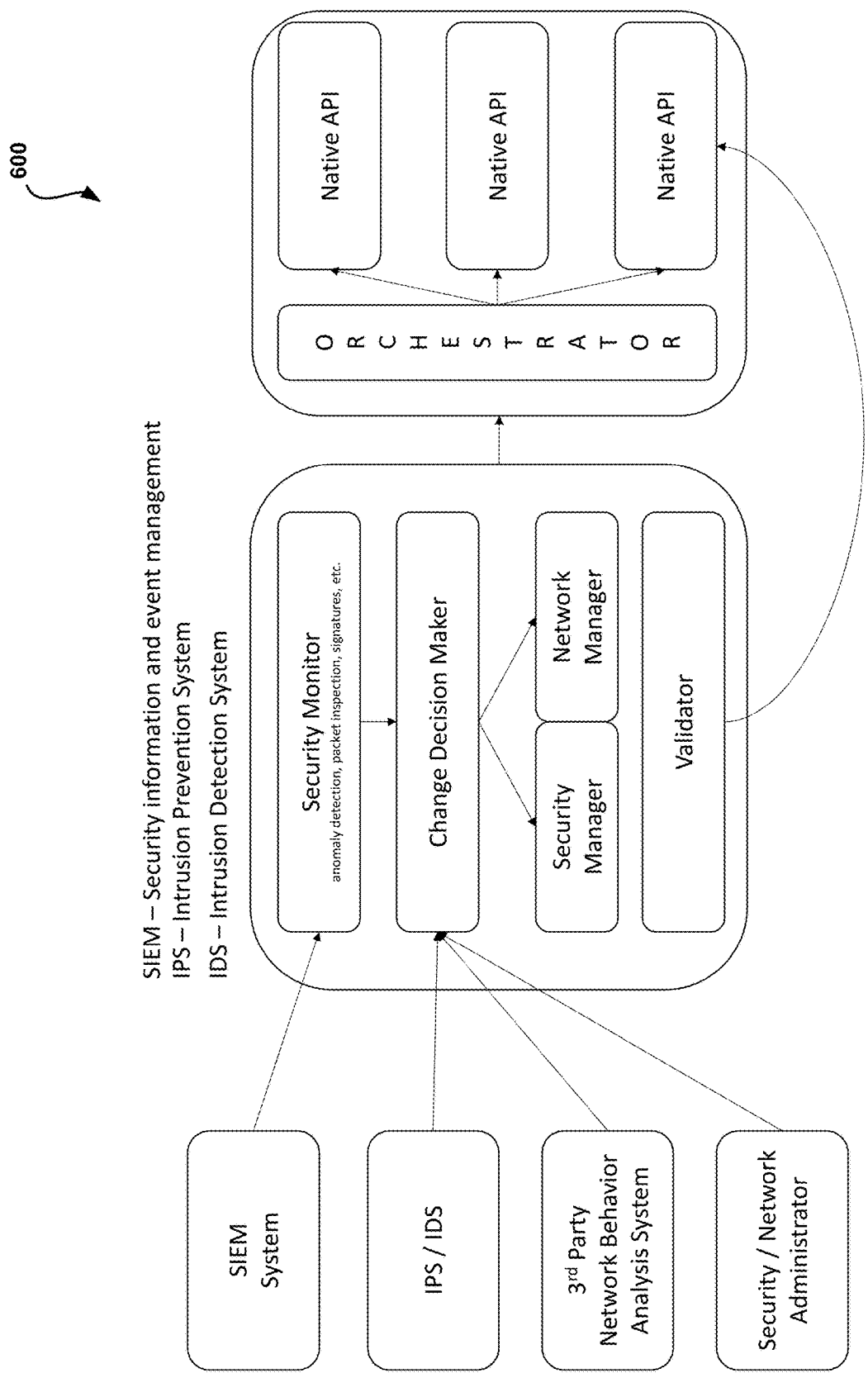
FIG. 6 illustrates a system architecture diagram for providing security in Network Function Virtualization based communication networks and Software Defined Networks, in accordance with one embodiment.

FIG. 6 illustrates a system architecture diagram 600 for providing security in Network Function Virtualization based communication networks and Software Defined Networks, in accordance with one embodiment. As an option, the diagram 600 may be viewed in the context of the details of the previous Figures. Of course, however, the diagram 600 may be viewed in the context of any desired environment. Further, the aforementioned definitions may equally apply to the description below.

In operation, an NFV network or SDN is continuously monitored. A security attack is identified. Additionally, any attacked assets are identified as well as the attack source. Further, network and security configuration changes are made to change the attack surface in order to block the attack. The attacked asset may be replaced with another equivalent asset with different properties, thus eliminating the attack. In some cases, the attacked asset may not be replaced. For example, network and/or security configuration changes may be enough to eliminate the attack.

FIG. 7A-7D illustrate system flow diagrams 700-760 for providing security in Network Function Virtualization based communication networks and Software Defined Networks, in accordance with one embodiment. As an option, the diagrams 700-760 may be viewed in the context of the details of the previous Figures. Of course, however, the diagrams 700-760 may be viewed in the context of any desired environment. Further, the aforementioned definitions may equally apply to the description below.

Figure 7A:
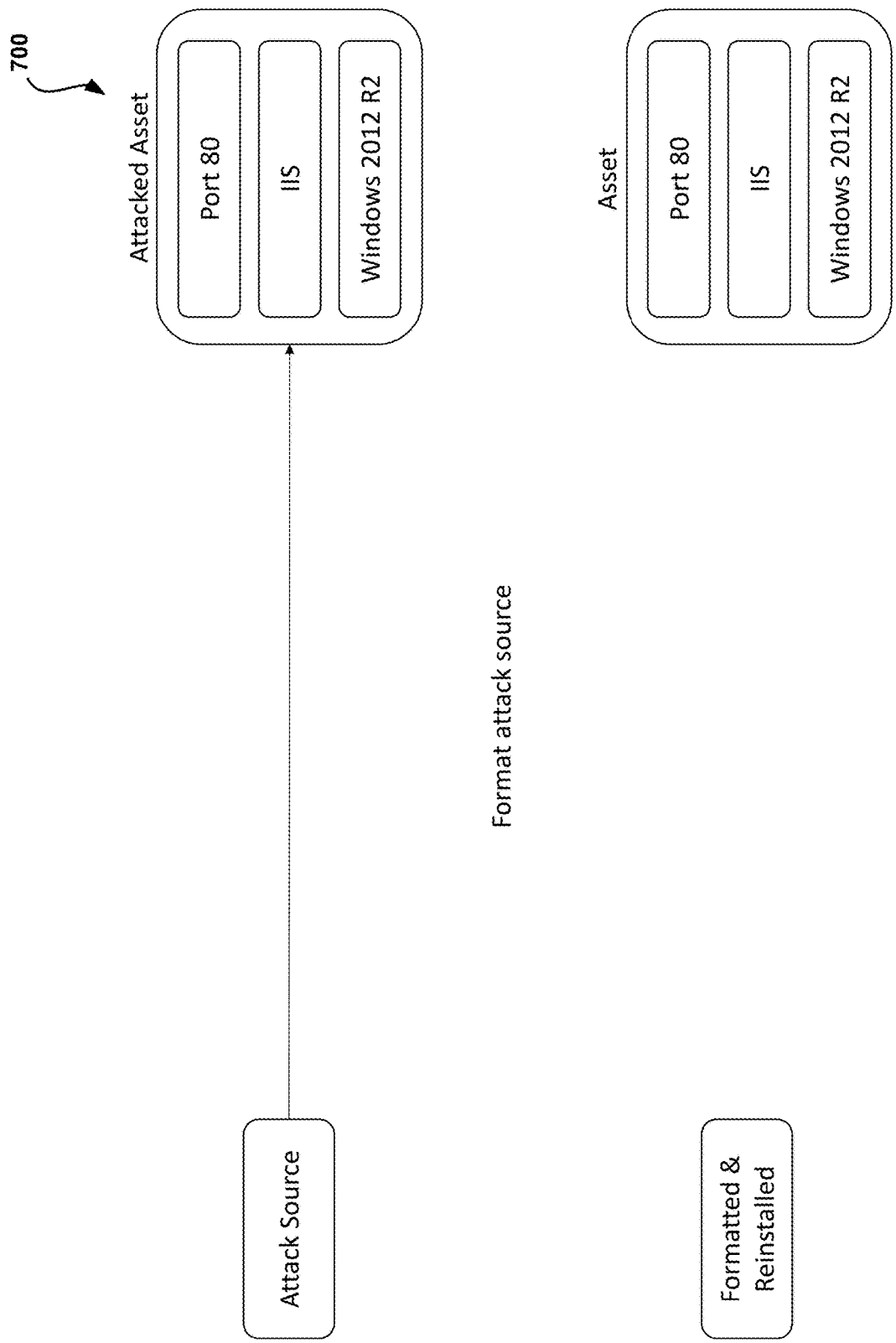
FIG. 7A-7D illustrate system flow diagrams for providing security in Network Function Virtualization based communication networks and Software Defined Networks, in accordance with one embodiment.
Figure 7B:
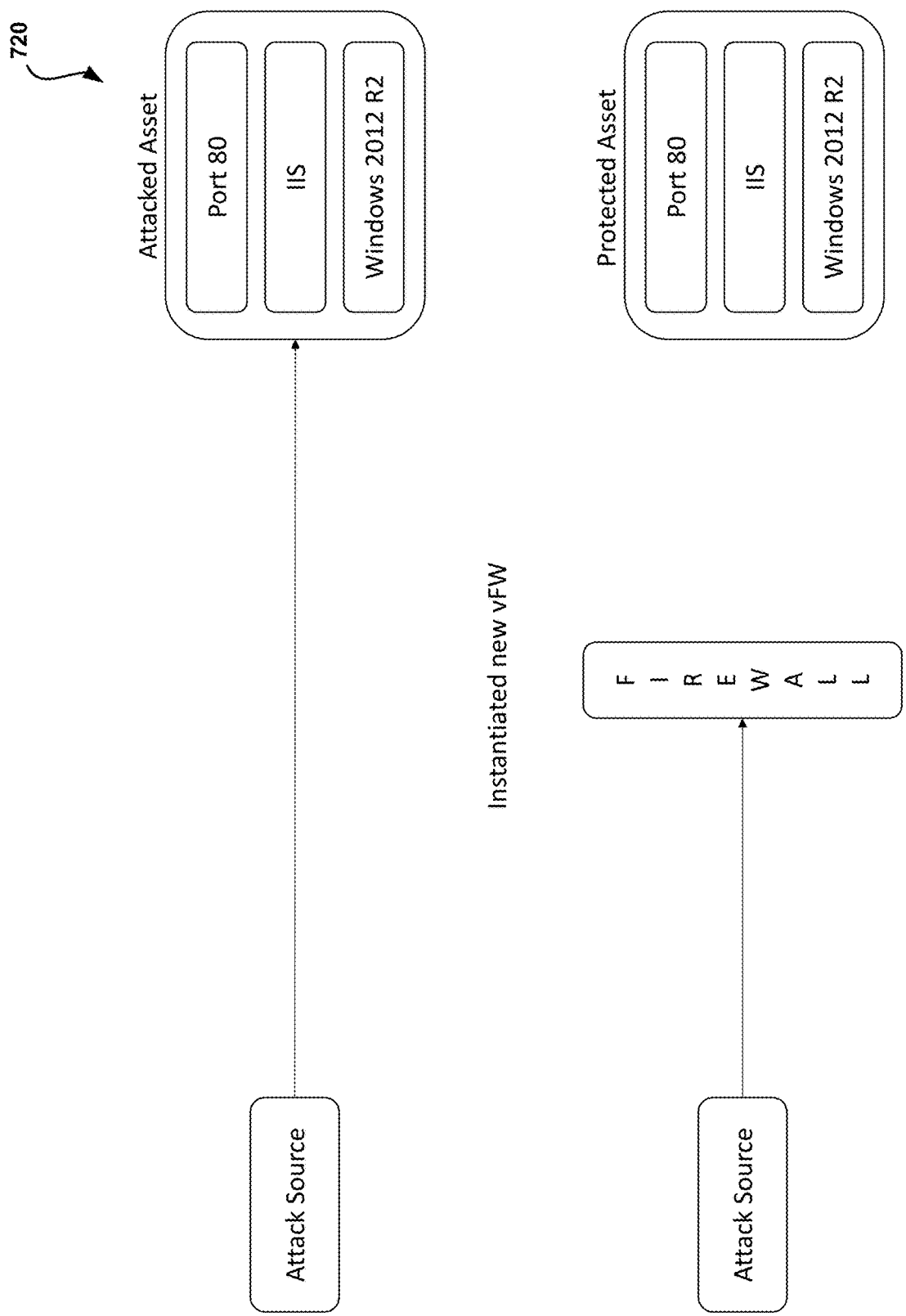
Figure 7C:
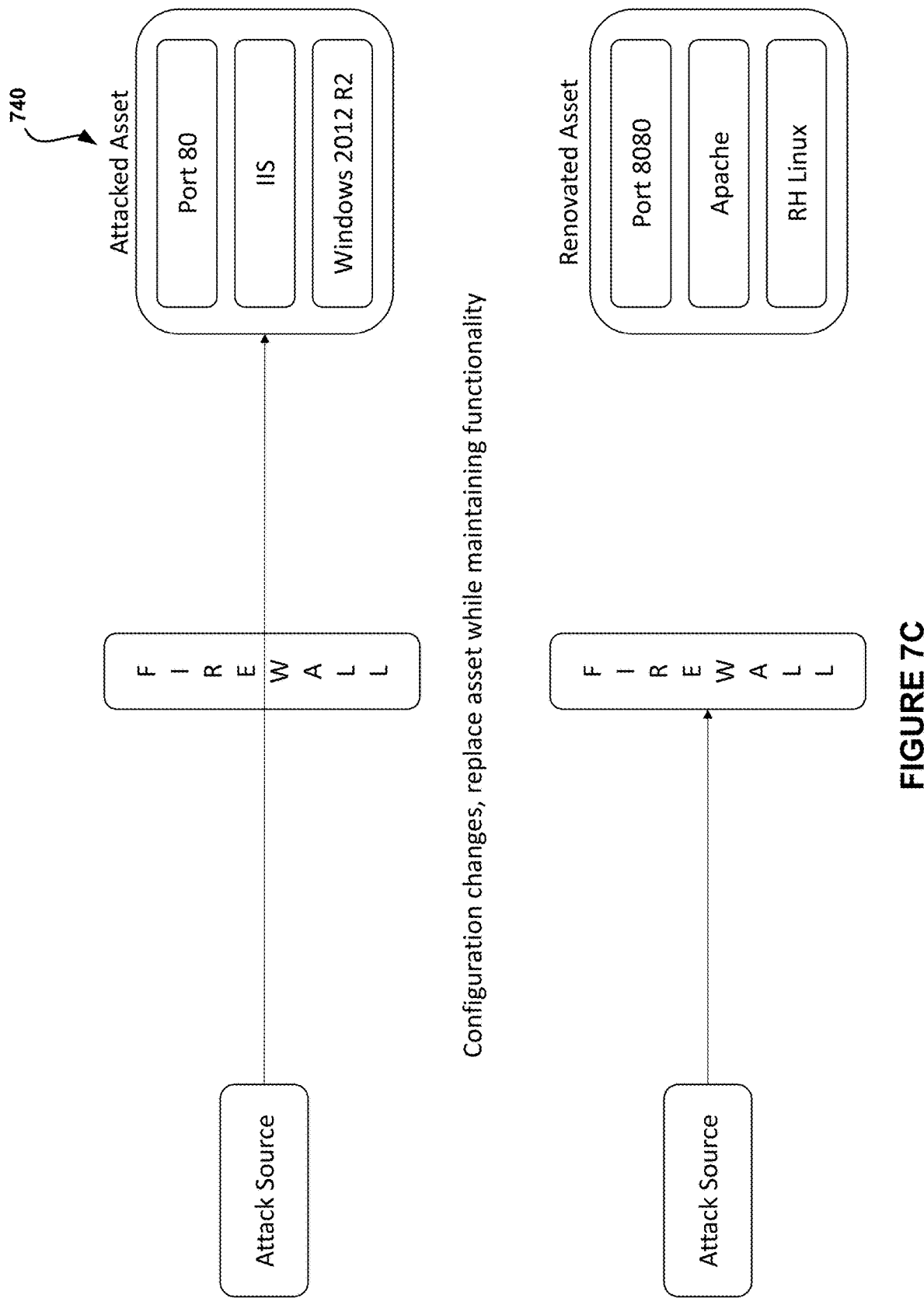
Figure 7D:
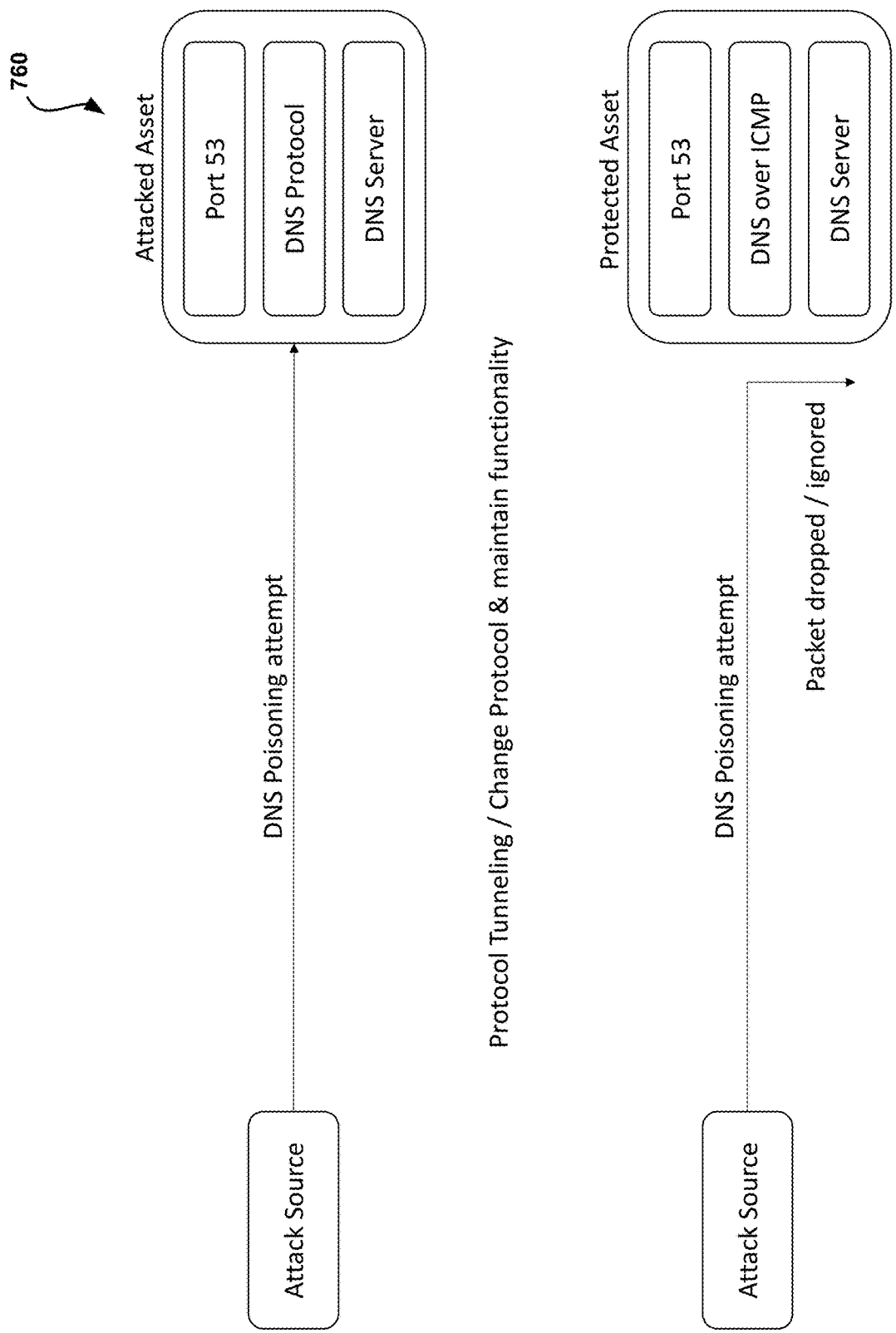

FIG. 7A shows a system flow example illustrating the formatting of an attack source, in one embodiment. FIG. 7B shows a system flow example illustrating the instantiation of a new virtual firewall (vFW). FIG. 7C shows a system flow example illustrating the implementation of configuration changes and replacement of an asset, while maintaining functionality. FIG. 7D shows a system flow example illustrating protocol tunneling/changing of protocol, while maintaining functionality.

It should be noted that the security techniques described herein may be applied to NFV networks or SDNs in various private or public cloud use cases, etc.

Figure 8:
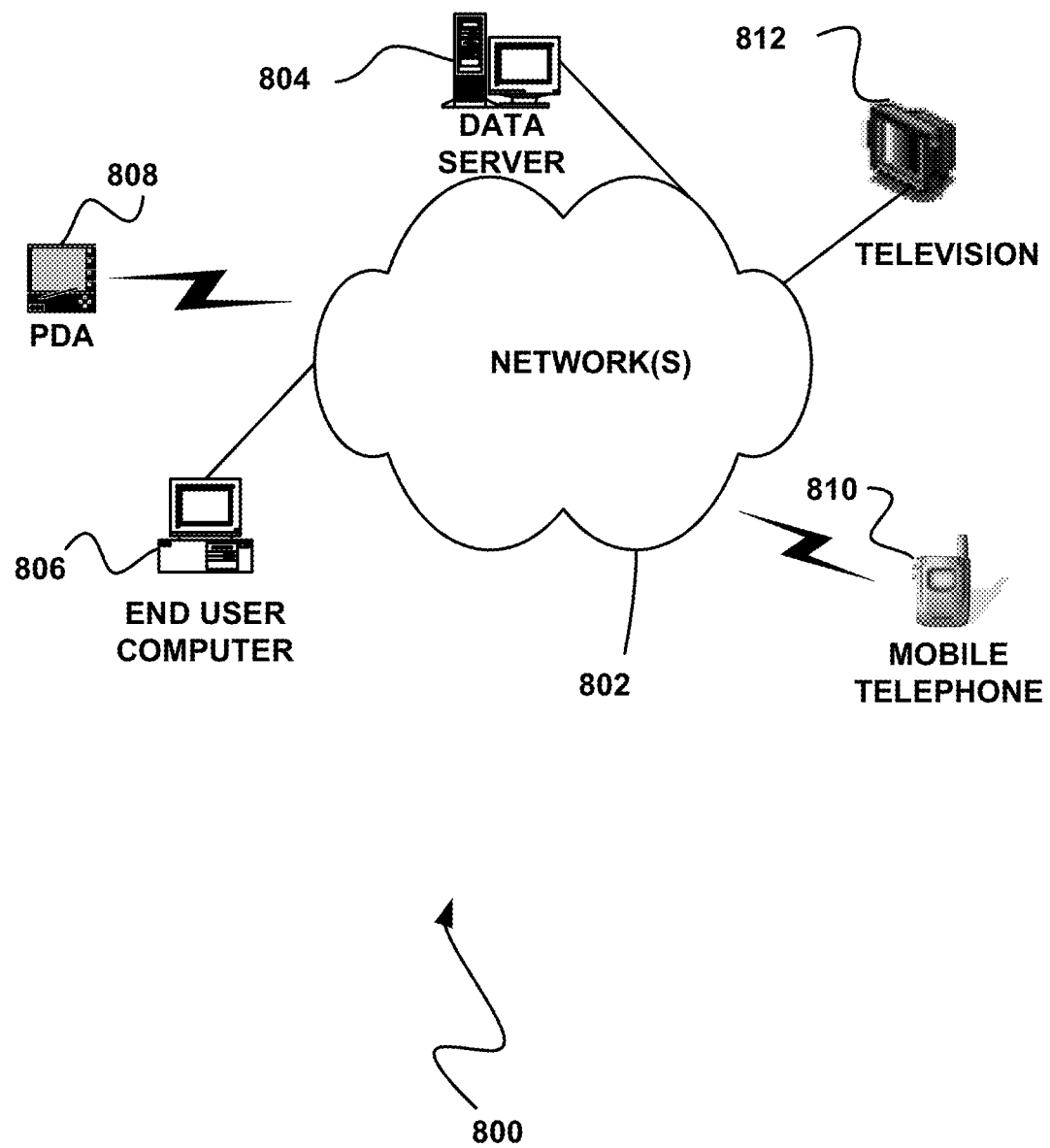
FIG. 8 illustrates a network architecture, in accordance with one possible embodiment.

FIG. 8 illustrates a network architecture 800, in accordance with one possible embodiment. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 804 and an end user computer 806 may be coupled to the network 802 for communication purposes. Such end user computer 806 may include a desktop computer, lap-top computer, and/or any other type of logic. Still yet, various other devices may be coupled to the network 802 including a personal digital assistant (PDA) device 808, a mobile phone device 810, a television 812, etc.

Figure 9:
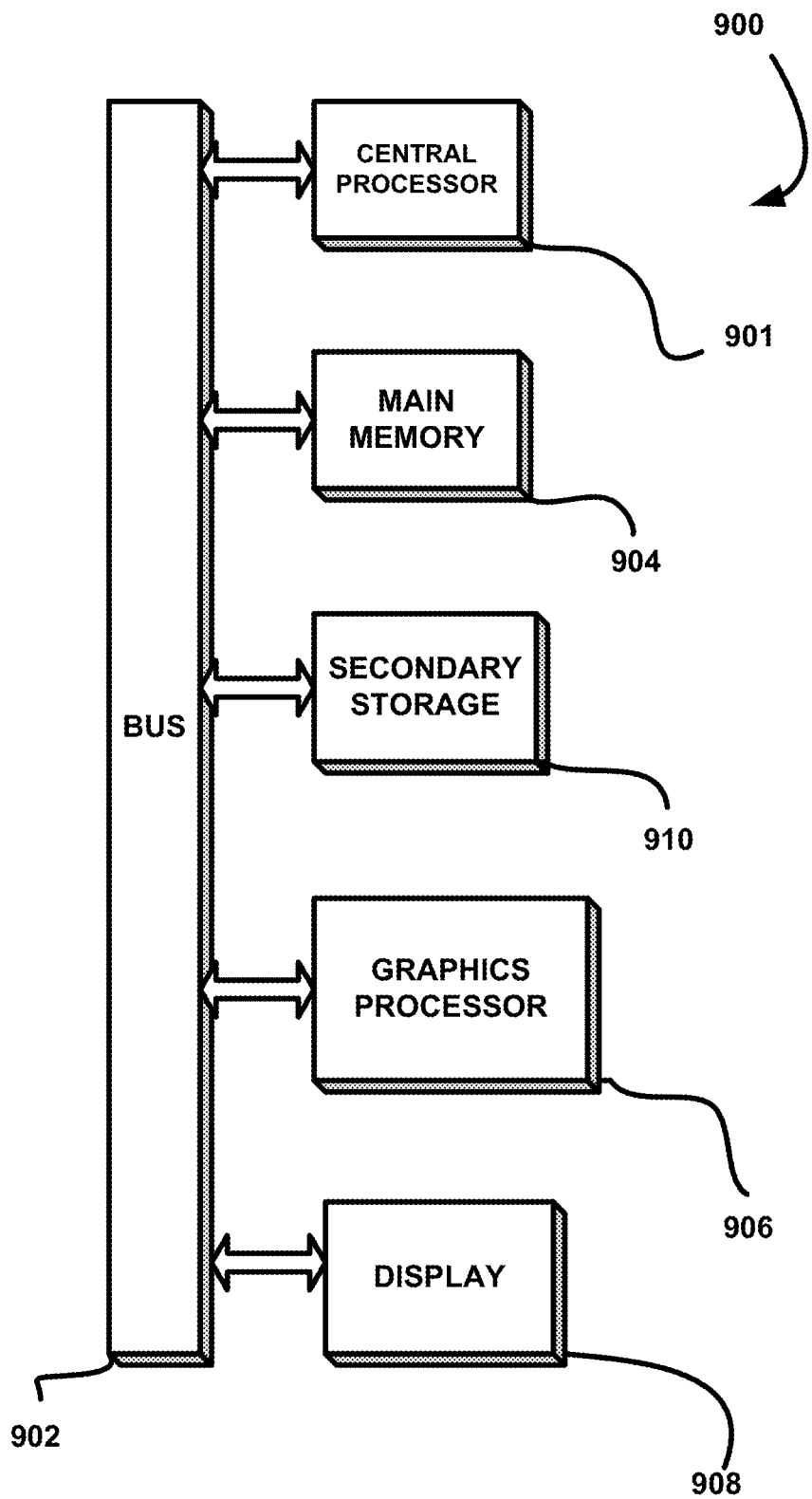
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. Of course, the system 900 may be implemented in any desired environment.

As shown, a system 900 is provided including at least one central processor 901 which is connected to a communication bus 902. The system 900 also includes main memory 904 [e.g. random access memory (RAM), etc.]. The system 900 also includes a graphics processor 906 and a display 908.

The system 900 may also include a secondary storage 910. The secondary storage 910 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 904, the secondary storage 910, and/or any other memory, for that matter. Such computer programs, when executed, enable the system 900 to perform various functions (as set forth above, for example). Memory 904, storage 910 and/or any other storage are possible examples of tangible computer-readable media.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   detecting, by a system, a trigger to change an attack surface of an environment, the trigger being a time-based event utilized for periodically changing the attack surface of the environment as a function of time;
   responsive to detecting the trigger, identifying, by the system, the attack surface of the environment, the attack surface including different points of the environment that are susceptible to an attack by an unauthorized user;
   implementing, by the system, one or more network changes or security configuration changes to a Network Function Virtualization (NFV) based communication network or a Software Defined Network (SDN) to change the identified attack surface of the environment, including:
   replacing a first asset of the environment with a second asset, wherein the second asset maintains service continuity by providing a same functionality as the first asset, and wherein the second asset includes properties that are different from properties of the first asset to render attacks via the attack surface ineffective;
   wherein the first asset is a first type of webserver operating on a first port and the second asset is second type of webserver operating on a second port.

2. The method of claim 1, further comprising:
   remediating, by the system, a security issue associated with the NFV based communication network or the SDN.

3. The method of claim 1, further comprising verifying that the one or more network changes or security configuration changes have been applied.

4. The method of claim 1, wherein the NFV based communication network or the SDN are associated with a private cloud or a public cloud.

5. The method of claim 1, wherein the one or more changes minimize the attack surface.

6. The method of claim 1, wherein the one or more changes further include:
   utilizing a different application;
   utilizing a different protocol; and
   utilizing different hardware.

7. A computer program product embodied on a non-transitory computer readable medium, comprising computer code for:
   detecting, by a system, a trigger to change an attack surface of an environment, the trigger being a time-based event utilized for periodically changing the attack surface of the environment as a function of time;
   responsive to detecting the trigger, identifying, by the system, the attack surface of the environment, the attack surface including different points of the environment that are susceptible to an attack by an unauthorized user;
   implementing, by the system, one or more network changes or security configuration changes to a Network Function Virtualization (NFV) based communication network or a Software Defined Network (SDN) to change the identified attack surface of the environment, including:
   replacing a first asset of the environment with a second asset, wherein the second asset maintains service continuity by providing a same functionality as the first asset, and wherein the second asset includes properties that are different from properties of the first asset to render attacks via the attack surface ineffective;
   wherein the first asset is a first type of webserver operating on a first port and the second asset is second type of webserver operating on a second port.

8. A system, comprising one or more hardware processors, operable for:
   detecting, by the system, a trigger to change an attack surface of an environment, the trigger being a time-based event utilized for periodically changing the attack surface of the environment as a function of time;
   responsive to detecting the trigger, identifying, by the system, the attack surface of the environment, the attack surface including different points of the environment that are susceptible to an attack by an unauthorized user;
   implementing, by the system, one or more network changes or security configuration changes to a Network Function Virtualization (NFV) based communication network or a Software Defined Network (SDN) to change the identified attack surface of the environment, including:
   replacing a first asset of the environment with a second asset, wherein the second asset maintains service continuity by providing a same functionality as the first asset, and wherein the second asset includes properties that are different from properties of the first asset to render attacks via the attack surface ineffective;

wherein the first asset is a first type of webserver operating on a first port and the second asset is second type of webserver operating on a second port.

\* \* \* \* \*